(12) United States Patent
Kim et al.

(10) Patent No.: US 7,700,704 B2
(45) Date of Patent: Apr. 20, 2010

(54) METHOD FOR PRODUCING AN (METH)ACRYLATE SYRUP

(75) Inventors: No-ma Kim, Daejeon (KR); Jae-gwan Lee, Daejeon (KR); Suk-ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/268,734

(22) Filed: Nov. 8, 2005

(65) Prior Publication Data

US 2006/0100407 A1    May 11, 2006

(30) Foreign Application Priority Data

Nov. 8, 2004    (KR) .................. 10-2004-0090368

(51) Int. Cl.
  *C08F 12/00*    (2006.01)
(52) U.S. Cl. .................. 526/318; 526/319; 526/222; 526/224
(58) Field of Classification Search .............. 526/318, 526/222, 224, 329, 319
  See application file for complete search history.

(56) References Cited

U.S. PATENT DOCUMENTS

| | | | |
|---|---|---|---|
| 4,287,317 A * | 9/1981 | Kitagawa et al. | 525/309 |
| 5,599,883 A * | 2/1997 | Ohsugi et al. | 525/474 |
| 6,399,731 B2 * | 6/2002 | King et al. | 526/318.4 |
| 6,448,330 B1 * | 9/2002 | Inoue et al. | 524/803 |
| 6,448,354 B1 * | 9/2002 | Hieda et al. | 526/319 |
| 6,602,333 B2 * | 8/2003 | Miyabayashi | 106/31.27 |
| 6,759,473 B1 * | 7/2004 | Nakamura et al. | 524/503 |
| 2003/0183106 A1 * | 10/2003 | Watanabe | 101/453 |

FOREIGN PATENT DOCUMENTS

| | | |
|---|---|---|
| JP | 40-3701 | 2/1940 |
| JP | 64-11652 | 1/1989 |
| JP | 9-67495 | 2/1989 |
| JP | 11-255828 | 9/1999 |
| JP | 2000159816 | 6/2000 |
| JP | 2000-313704 | 11/2000 |
| JP | 2000313704 A * | 11/2000 |
| JP | 200131709 | 6/2001 |

* cited by examiner

*Primary Examiner*—David Wu
*Assistant Examiner*—Michael M Bernshteyn
(74) *Attorney, Agent, or Firm*—McKenna Long & Aldridge LLP

(57) ABSTRACT

The present invention provides a method for producing an (meth)acrylate syrup by bulk polymerization which is characterized by:
  a) using (meth)acrylate ester monomer; and
  b) using 2,4-diphenyl-4methyl-1-pentenol singly or together with a thiol chain transfer agent as a chain transfer agent,
  c) initiating polymerization by adding an initiator having the half-life of up to 30 minutes at 55-80° C. of initial reaction temperature, so as to maintain the peak reactor temperature below 95° C. and the reactor conversion rate as 5-50 weight %.

The method for producing an (meth)acrylate syrup of the present invention has such advantages that reaction runaway does not occur, the control of molecular weight and conversion rate is possible even at low exothermic temperature without stirring failure, and a partially polymerized (meth)acrylate syrup can also be prepared therefrom.

6 Claims, No Drawings

METHOD FOR PRODUCING AN (METH)ACRYLATE SYRUP

This application claims the benefit of the filing date of Korean Patent Application No. 10-2004-0090368, filed on Nov. 8, 2004, in the Korean Intellectual Property Office, the disclosure of which is incorporated herein in its entirety by reference.

TECHNICAL FIELD

The present invention relates to a method for producing an (meth)acrylate syrup. More precisely, the present invention relates to a method for producing an (meth)acrylate syrup in which it is possible to form a high-molecular weight (meth) acrylate syrup, reaction runaway does not occur and it is easy to control molecular weight.

BACKGROUND ART

The (meth)acrylate syrup has been used as an intermediate raw-material for methacryl resin substrate, optical materials including optical transmission fiber or optical waveguide, acryl artificial marble, floor materials, adhesives, and medical supplies.

The (meth)acrylate syrup can be produced by bulk polymerization, solution polymerization, emulsion polymerization, suspension polymerization and photo polymerization owing to the excellent reactivity of (meth)acrylate monomers. As these materials for use in the respective applications became highly functional, the use of solution polymerization, emulsion polymerization and suspension polymerization for their production required much energy for the removal of residues. In addition, in the use of these polymerization processes, it was difficult to exhibit high function, and the load to environment was high. For these reasons, it is a tendency to produce (meth)acrylate by bulk polymerization or photo polymerization which is carried out in the absence of solvents.

In carrying out bulk polymerization or photo polymerization, heat transfer is difficult due to the absence of a solvent, and in particular in carrying out the process in a general batch reactor, the reactor temperature is difficult to control, resulting in a high possibility for reaction runaway, and the termination of production of radicals is reduced due to a rapid increase in viscosity resulting from an increase in conversion rate. Thus, a phenomenon, such as the partial formation of gel, occurs, and non-uniform resin with wide range of molecular weight is liable to be, obtained.

To overcome the problems of the high chance of reaction runaway and viscosity increase, the use of a semi-batch, continuous or plug flow reactor in place of the batch reactor has been reported. Japanese patent laid-open publication Nos. Sho 40-003701, Hei 11-255828 and 2000-159816 disclose high-temperature polymerization with the use of this continuous polymerization method.

However, the polymerization in this reactor has a problem in that it has a high economic burden, because not only the reactor itself is expensive but also the cost of utilities is significant. Another problem is that it is unfavorable for the production of small amounts of many different species, although it is suitable for the production of large amounts of a few species.

In an attempt to solve these problems, a method is known that carries out polymerization in the batch reactor under the mildest possible conditions. This is a method where the temperature of a reaction system is maintained at a constant level while forcibly terminating polymerization when the conversion or viscosity of the reaction system reaches a given level. Regarding the method for the termination of polymerization, Japanese patent laid-open publication No. Hei 1-11652 discloses the termination of polymerization by the addition of a polymerization inhibitor, and Japanese patent laid-open publication No. Hei 9-67495 discloses polymerization termination, such as quenching by the addition of monomers.

However, this polymerization method cannot become a fundamental solution because it has shortcomings in that it causes a great increase in viscosity at the latter half of reaction, shows a difference in physical properties depending on the time point of completion of reaction, and results in polymer syrup with poor storage stability because a polymerization initiator remains in the syrup.

In an attempt to solve these problems, there have been many solutions where a batch reactor is used but reaction runaway does not occur and the molecular weight of syrup is easily controlled.

First, there are examples where bulk polymerization was carried out without causing reaction runaway due to the non-use of a polymerization initiator.

Japanese patent laid-open publication No. 2001-31709 discloses carrying out the bulk polymerization of a compound with a thiol group and a secondary hydroxyl group, and a compound with a secondary hydroxyl group without a thiol group as a catalyst thereof. Also, Japanese patent laid-open publication No. 2001-302705 discloses carrying out the bulk polymerization of a compound with both a thiol group and a carboxyl group in the substantial absence of an initiator.

However, in carrying out the above polymerization using a huge amount of thiol groups, the residue of thiol groups in syrup reduced the properties including storage stability of a final syrup product.

Japanese patent laid-open publication No. 2000-313704 discloses synthesizing an acrylate syrup with a conversion rate of 10-50%, in which 0.0001-0.5 parts by weight of an polymerization initiator with a 10-hr half-life at the temperature of less than 41° C. is used, the self-heat generation at reaction temperature of 20-80° C. is used, and the peak exothermic temperature of reactants reaches a range of 100-140° C. This polymerization method is based on the idea that the rapid increase in the concentration of radicals at the initial stage of reaction, resulted from the addition of an initiator which used to be decomposed at low temperature at a relatively high reaction temperature, causes the rapid increase of reaction speed, and as a result, the reactor temperature is increased, the half-life of the initiator drops rapidly and finally the depletion of initiator occurs resulting in stopping of reaction.

However, from the thorough examination, the present inventors concluded that this method needs a proper amount of an initiator to obtain a satisfactory result, which suggests a problem of high exothermic temperature. Thus, a highly sensitive cooling system is required during scale-up, nevertheless there is still a possibility of reaction runaway. In addition, the method which has the peak exothermic temperature of reactants ranging 100-140° C. is not applicable to low boiling point monomers such as ethyl acrylate (boiling point=99° C.) and butyl acrylate (boiling point=145° C.) and there is a problem of rapid spontaneous thermo polymerization by a high temperature unless the reactor is not rapidly cooled down at such high temperature. In the meantime, in production of high molecular weight acrylate syrup having more than a million of molecular weight, the conversion rate should be maintained as low as possible because of the steep increase in viscosity, but the method described in Japanese patent laid-open publication No. 2000-313704 is carried out without lowering the conversion rate, meaning that it has problems of unstable stirring and formation of gel due to the rapid increase of viscosity to produce a syrup having more than a million of molecular weight.

DISCLOSURE OF INVENTION

It is an object of the present invention, to overcome the above problems, to provide a method for producing (meth) acrylate syrup at an industrial scale in which reaction runaway does not occur, it is easy to control molecular weight and it is possible to form a high molecular weight (meth) acrylate syrup.

In general, a thiol chain transfer agent is used to regulate molecular weight in the production of (meth)acrylate syrup. The use of a thiol molecular weight regulator enables easy control of molecular weight but makes the control of reaction speed difficult.

Therefore, it is also an object of the present invention to provide a more stable method for producing acrylate syrup in which molecular weight and reaction speed are regulated by using 2,4-diphenyl-4-methyl-1-pentene singly or together with a thiol chain transfer agent in the place of a thiol chain transfer agent and spontaneous thermo-polymerization is also effectively inhibited at high temperatures.

To achieve the above objects, the present invention provides a method for producing (meth)acrylate syrup by bulk polymerization which is characterized by:

a) using (meth)acrylate ester monomer; and b) using 2,4-diphenyl-4methyl-1-pentene singly or together with a thiol chain transfer agent as a chain transfer agent, c) initiating polymerization by adding an initiator having the half-life of up to 30 minutes at 55-80° C. of initial reaction temperature, so as to maintain the peak reactor temperature below 95° C. and the reactor conversion rate as 5-50 weight %.

The present invention is described in detail hereinafter.

The (meth)acrylate ester monomer used in the inventive method is not specifically limited and may be one generally used in the art.

The (meth)acrylate ester monomer of the above a) is exemplified by acrylic acid alkyl ester such as acrylic acid methyl, acrylic acid ethyl, acrylic acid propyl, acrylic acid butyl, acrylic acid pentyl, acrylic acid hexyl, acrylic acid 2-ethyl hexyl, acrylic acid octyl, acrylic acid nonyl, acrylic acid decyl, acrylic acid dodecyl; acrylic acid aryl ester such as acrylic acid phenyl and acrylic acid benzyl; acrylic acid alkoxy alkyl such as acrylic acid methoxy ethyl, acrylic acid ethoxy methyl, acrylic acid propoxy ethyl, acrylic acid butoxy ethyl, acrylic acid ethoxy propyl; acrylic acid and acrylic acid alkali metal salt; methacrylic acid and methacrylic acid alkali metal salt; methacrylic acid alkyl ester such as methacrylic acid methyl, methacrylic acid ethyl, methacrylic acid propyl, methacrylic acid butyl, methacrylic acid pentyl, methacrylic acid hexyl, methacrylic acid 2-ethyl hexyl, methacrylic acid octyl, methacrylic acid nonyl, methacrylic acid decyl, methacrylic acid dodecyl; methacrylic acid aryl ester such as methacrylic acid phenyl and methacrylic acid benzyl; methacrylic acid alkoxy alkyl such as methacrylic acid methoxy ethyl, methacrylic acid ethoxy methyl, methacrylic acid propoxy ethyl, methacrylic acid butoxy ethyl, methacrylic acid ethoxy propyl; (poly)alkylene glycol diacrylic acid ester such as ethylene glycol diacrylic acid ester, diethylene glycol diacrylic acid ester, triethylene glycol diacrylic acid ester, polyestylene glycol diacrylic acid ester, propylene glycol diacrylic acid ester; (poly)alkylene glycol dimethacrylic acid ester such as ethylene glycol dimethacrylic acid ester, diethylene glycol dimethacrylic acid ester, triethylene glycol dimethacrylic acid ester, polyestylene glycol dimethacrylic acid ester, propylene glycol dimethacrylic acid ester; multivalent acrylic acid ester such as trimethylpropane triacrylic acid ester; multivalent methacrylic acid ester such as trimethylpropane trimethacrylic acid ester; acrylonitrile; methacrylonitrile; vinyl acetate; vinylidene chloride; vinyl halide compound such as acrylic acid 2-chloroethyl and methacrylic acid 2-chloroethyl; cyclic alcohol acrylic acid ester such as acrylic acid cyclohexyl; cyclic alcohol methacrylic acid ester such as methacrylic acid cyclohexyl; polymerized compound containing oxazoline group such as 2-vinyl-2-oxazoline, 2-vinyl-5-methyl-2-oxazoline and 2-isoprophenyl-2-oxazoline; polymerized compound containing agitation lysine such as acryoyl agitation lysine, methacryoyl agitation lysine, acrylic acid-2-aziridinyl ethyl and methacrylic acid-2-aziridinyl ethyl; polymerized compound containing epoxy such as aryl glycidyl ether, acrylic acid glycidyl ether, methacrylic acid glycidyl ether, acrylic acid 2-ethyl glycidyl ether and methacrylic acid 2-ethyl glycidyl ether; vinyl compound containing hydroxyl group such as acrylic acid 2-hydroxyethyl, acrylic acid 2-hydroxypropyl, acrylic acid 2-hydroxybutyl, methacrylic acid 2-hydroxyethyl, acrylic acid or methacrylic acid, polypropylene glycol or polyestylene glycol monoester and additives of the mixture of lactones and (meth)acrylic acid; vinyl monomer containing fluorine such as fluorine-substituted methacrylic acid alkyl ester and fluorine-substituted acrylic acid alkyl ester; unsaturated carbonic acid such as itaconic acid except (meth)acrylic acid, crotonic acid, maleic acid and fumaric acid or their salts; ester compound and acid anhydride; vinyl monomer containing reactive halogen such as 2-chloro ethyl vinyl ether and monochloro vinyl acetate; vinyl monomer containing amide group such as methacryl amide, N-methylol methacryl amide, N-methoxy ethyl methacryl amide and N-butoxy methyl methacryl amide; vinyl monomer containing amine group such as N-vinyl pyrrolidone and N-vinyl caprolactam; vinyl monomer containing silicone such as vinyl trimethoxy silane, y-methacryloxy propyl trimethoxy silane, aryl trimethoxy silane, trimethoxy silyl propyl allyl amine and 2-methoxy ethoxy trimethoxy silane; styrene and macro monomers having radical polymerized vinyl group at the end of monomer polymerized with vinyl group.

In the bulk polymerization of the present invention, the content of acrylic acid alkyl ester monomer in (meth)acrylate ester monomer is not specifically limited, however 0.1-100 weight part in 100 weight part of (meth)acrylate ester is preferred and 1-100 weight part is more preferred.

For the chain transfer agent of the above b), 2,4-diphenyl-4-methyl-1-pentene (α-methyl styrene dimer, AMSD) can be used independently or together with a thiol chain transfer agent. The single use of a conventional thiol chain transfer agent in the polymerization guided by the present invention causes rapid increase of peak reaction temperature owing to the excessive reactivity.

A thiol chain transfer agent for the present invention can be selected among organic compounds having thiol group (—SH), but the selection is not limited thereto. For example, it is possible to use one of alkyl mercaptans including ethyl mercaptan, butyl mercaptan, hexyl mercaptan and dodecyl mercaptan; thiophenols including phenyl mercaptan and benzyl mercaptna; mercaptans containing carboxyl group such as thioglycolic acid, 3-mercapto propionic acid and thiosalicylic acid; mercaptans containing hydroxyl group such as 2-mercpato ethanol and 3-mercpato-1,2-propanediol; and mercaptans containing two or more functional groups like the above such as pentaerythritol tertrakis(3-mercapto)propionate, etc.

The required amount of AMSD chain transfer agent is 0.001-5.0 weight part for 100 weight part of acrylate ester monomer composition of a), and the amount of 0.001-1.0 weight part is more preferred and the amount of 0.001-0.5 weight part is most preferred. The amount of AMSD less than 0.001 weight part makes the control of heating value in the polymerization difficult, and on the contrary the content of AMSD more than 5.0 weight part reduces the reaction speed, resulting in the poor conversion rate.

It is also possible to use a thiol molecular weight regulator together with AMSD molecular weight regulator. If the amount of use of the thiol chain transfer agent is less than 0.00001 weight part, polymerization will rapidly progress and at the same time, uniform mixing within a reactor will not be made, and the molecular weight of the resulting polymer will excessively increase. If it is more than 5 weight part, polymerization rate will become slow and molecular weight will be excessively reduced, resulting in deterioration in the physical properties of a final product. Therefore, it is preferred to use a thiol chain transfer agent by 0.00001-5.0 weight part for 100 weight part of (meth)acrylate ester monomer.

The polymerization initiator of c) is not specifically limited if it is a compound having half-life less than 30 minutes at the reaction temperature of 5-80° C., and is exemplified by azo initiator such as 2,2-azobis-4-methoxy-2,4-dimethylvaleronitrile (Wako V-70), 2,2-azobis-2,4-dimethylvaleronitrile (Wako V-65), 2,2-azobis-isobutyronitrile (Wako V-60) and 2,2-azobis-2-methyl-butyronitrile (Wako V-59); isobutyryl peroxide (NOF, Peroyl IB), bisneodecanoyl peroxy diisopropyl benzene (NOF, Percumyl BF), cumyl peroxy neodecanoate (NOF, Percumyl ND), dipropyl peroxy dicarbonate (NOF, Peroyl NPP), diisopropyl peroxy dicarbonate (NOF, Peroyl IPP), tetramethyl butyl peroxy neodecanate (NOF, Perocta ND), bis-4-butylcyclohexyl peroxy dicarbonate (NOF, Peroyl TCP), diethoxyethyl peroxy dicarbonate (NOF, Peroyl EEP), diethoxyhexyl peroxy dicarbonate (NOF, Peroyl OPP), hexyl peroxy dicarbonate (NOF, Perhexyl ND), dimethoxybutyl peroxy dicarbonate (NOF, Peroyl MBP), bis (3-methoxy-3methoxybutyl)peroxy dicarbonate (NOF, Peroyl SOP), butyl peroxy neodecanoate (NOF, Perbutyl ND), hexyl peroxy pivalate (NOF, Perhexyl PV), butyl peroxy pivalate (NOF, Perbutyl), trimethylhexanoyl peroxide (NOF, Peroyl 355), dimethyl hydroxybutyl peroxy neodecanoate (Atofina, Luperox 610M75), amyl peroxy neodecanoate (Atofina, Luperox 546M75), butyl peroxy neodecanoate (Atofina, Luperox 10M75), amyl peroxy pivalate (Atofina, Luperox 546M75), etc.

The required amount of the initiator of the above c) is 0.0001-0.5 weight part for 100 weight part of the acrylate ester monomer composition of a). Particularly, the amount of 0.001-0.3 weight part is more preferred and the amount of 0.001-0.1 weight part is most preferred. If the amount of the initiator is less than 0.0001 weight part, the initiation efficiency decreases and the reaction is not completed satisfactorily. If the amount of the initiator is 0.5 weight part or more, the control of polymerization temperature is difficult.

If the polymerization reaction of the invention meets the above conditions, the initiator is decomposed and the reaction is terminated with peak exothermic temperature of less than 95° C., in about an hour from the start of polymerization.

Partially polymerized (meth)acrylate syrup in which 5-50 weight % of the raw material monomer is polymerized might be obtained by one time polymerization with a small amount of any selected initiator, which may be diluted several times with additional initiators to regulate the conversion rate of each phase until the final conversion rate reaches about 98%.

In the present invention, a polymerization inhibitor may also be used. The polymerization inhibitor is not specifically limited if it is a compound capable of absorbing radicals to terminate radical reaction, for example, hydroquinone, or 4-methoxyphenol.

In the preferred embodiment of the present invention, it is preferred to perform polymerization with stirring and substitution with inert gas like nitrogen is required before reaction starts.

BEST MODES FOR CARRYING OUT THE INVENTION

Hereinafter, preferred examples will be presented for a better understanding of the present invention. It is to be understood, however, that theses examples are given for illustrative purpose only and are not construed to limit the scope of the present invention.

The physical properties of the (meth)acrylate syrup synthesized by the inventive method are evaluated in the following manner.

1. Measurement of Solid Concentration

The concentration of solids in the syrup is measured by dropping about 0.1-1.3 g of the syrup onto a previously weighed aluminum dish, measuring the weight of the resulting dish, drying the syrup in an oven at 130° C. for 1 hour, and then, measuring the weight of the dried dish.

2. Measurement of Viscosity

The viscosity of the syrup is measured with a Brookfield viscometer.

3. Measurement of Molecular Weight

Upon completion of the reaction, the acrylate syrup was dried at high temperature, and weight average molecular weight was measured by using gel permeation chromatography as follows.

(1) Analytical Instrument
Manufacturer: Waters Alliance System
Column: PL Mixed B type
Analyzer: Refractive index detector
(2) Analytical Condition
Flow rate: 1 ml/min
Moving phase solvent: Tetra hydro furane
Column temperature: 40° C.
Sample concentration: 1 mg/ml
Sample amount: 200 μL

EXAMPLE 1

Into a 3-liter four neck glass reactor equipped with a nitrogen gas inlet tube, a stirrer, a temperature sensor, a condenser and an outside cooling jacket was added 1880 g of acrylic acid 2-ethyl hexyl, 120 g of acrylic acid, 1 g of 2,4-diphenyl-4-methyl-1-pentene and 0.002 g of n-dodecyl mercaptan. The mixture was heated to the reaction temperature of 78° C. while removing dissolved oxygen with nitrogen stream for 30 minutes. Then, 0.012 g of 2,2-azobis-4-methoxy-2,4-dimethylvaleronitrile (Wako, V-70) was added to initiate reaction. Temperature in the reaction was elevated to the peak exothermic temperature of 83° C. only within about 2 minutes, and then three minutes later, lowered to the reaction temperature set prior to the initiation of the reaction. After that, an increase in the viscosity of the reaction solution did not occur and after one hour, the reaction solution was cooled down at room temperature, resulting in the termination of the reaction.

The concentration of solids in the partially polymerized syrup thus obtained was 6%, and the syrup had a viscosity of 200 centipoise (cP) and a molecular weight of 220,000.

EXAMPLE 2

Into the same reactor as used in the above Example 1 was added 1880 g of acrylic acid 2-ethyl hexyl, 120 g of acrylic acid, 0.4 g of 2,4-diphenyl-4-methyl-1-pentene and 0.002 g of n-dodecyl mercaptan. The mixture was heated to the reaction temperature of 67° C. while removing dissolved oxygen with nitrogen stream for 30 minutes. Then, 0.04 g of 2,2-azobis-4-methoxy-2,4-dimethylvaleronitrile (Wako, V-70) was added to initiate reaction. Temperature in the reaction was elevated to the peak exothermic temperature of 72° C. within about 15 minutes, and then 20 minutes later, lowered to the reaction temperature set prior to the initiation of the reaction. Then, 0.04 g of the same initiator as used in the above was added to repeat the reaction. Temperature in the reaction was elevated to the peak exothermic temperature of 77° C. within about 15 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 24.2%, and the syrup had a viscosity of 6600 centipoise (cP) and a molecular weight of 550,000.

EXAMPLE 3

Into the same reactor as used in the above Example 1 was added 1880 g of acrylic acid 2-ethyl hexyl, 120 g of acrylic acid, 0.2 g of 2,4-diphenyl-4-methyl-1-pentene and 0.001 g of n-dodecyl mercaptan. The mixture was heated to the reaction temperature of 57° C. while removing dissolved oxygen with nitrogen stream for 30 minutes. Then, 0.02 g of 2,2-azobis-4-methoxy-2,4-dimethylvaleronitrile (Wako, V-70) was added to initiate reaction. Temperature in the reaction was elevated to the peak exothermic temperature of 63° C. within about 20 minutes, and then 25 minutes later, lowered to the reaction temperature set prior to the initiation of the reaction. Then, 0.02 g of the same initiator as used in the above was added to repeat the reaction. Temperature in the reaction was elevated to the peak exothermic temperature of 66° C. within about 20 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 22.6%, and the syrup had a viscosity of 29000 centipoise (cP) and a molecular weight of 1,200,000.

EXAMPLE 4

Into the same reactor as used in the above Example 1 was added 1880 g of acrylic acid 2-ethyl hexyl, 120 g of acrylic acid, 0.34 g of 2,4-diphenyl-4-methyl-1-pentene and 0.4 g of n-dodecyl mercaptan. The mixture was heated to the reaction temperature of 57° C. while removing dissolved oxygen with nitrogen stream for 30 minutes. Then, 0.18 g of 2,2-azobis-4-methoxy-2,4-dimethylvaleronitrile (Wako, V-70) was added to initiate reaction. Temperature in the reaction was elevated to the peak exothermic temperature of 76° C. within about 15 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 32.1%, and the syrup had a viscosity of 2000 centipoise (cP) and a molecular weight of 250,000.

EXAMPLE 5

Into the same reactor as used in the above Example 1 was added 1880 g of acrylic acid 2-ethyl hexyl, 120 g of acrylic acid, 1.6 g of 2,4-diphenyl-4-methyl-1-pentene and 0.001 g of n-dodecyl mercaptan. Then, 0.06 g of ethyl hexyl peroxy dicarbonate was added as an initiator to initiate reaction at 82° C. Temperature in the reaction was elevated to the peak exothermic temperature of 89° C. within about 12 minutes, and then 30 minutes later, lowered to the reaction temperature set prior to the initiation of the reaction. Then, 0.06 g of the same initiator as used in the above was added to repeat the reaction. Temperature in the reaction was elevated to the peak exothermic temperature of 88° C. within about 10 minutes, and then 28 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 38.0%, and the syrup had a viscosity of 4500 centipoise (cP) and a molecular weight of 300,000.

COMPARATIVE EXAMPLE 1

Reaction was performed in the same manner as described in Example 4 except that 2,4-diphenyl-4-methyl-1-pentene was not used. The reactor was equipped with a separate stainless cooling coil to circulate coolant, together with reactor jacket, at the same temperature as the initial reaction temperature. After the addition of an initiator, the temperature in the reaction was elevated to the peak exothermic temperature of 145☐ within 4 minutes, and 50 minutes later, lowered to the reaction temperature set prior to the initiation of the reaction.

The concentration of solids in the partially polymerized syrup thus obtained was 55.0%, and the syrup had a viscosity of 30,000 centipoise (cP) and a molecular weight of 390,000.

COMPARATIVE EXAMPLE 2

Reaction was performed in the same manner as described in Example 4 except that 2,4-diphenyl-4-methyl-1-pentene was not used. At that time, the reactor was not equipped with a separate stainless cooling coil. After the addition of an initiator, the temperature in the reaction was elevated to the peak exothermic temperature of 155° C. within 4 minutes and the temperature was maintained by thermo polymerization. To lower the temperature, 10% of the initially used monomer was added, resulting in the decrease of reaction temperature to around 100° C. The temperature of reaction system was maintained over 90° C. 50 minutes later, stirring was almost impossible, so the reaction was forcibly terminated.

The concentration of solids in the partially polymerized syrup thus obtained was 67.0%, and the syrup had a viscosity of 90,000 centipoise (cP) and a molecular weight of 590,000.

COMPARATIVE EXAMPLE 3

Reaction was performed in the same manner as described in Example 3 except that 0.001 g of n-dodecyl mercaptan was used instead of 2,4-diphenyl-4-methyl-1-pentene. Temperature in the reaction was elevated to the peak exothermic temperature of 105° C. within three minutes, and maintained for 20 minutes. Then, stirring became impossible, so the reaction was forcibly terminated.

The concentration of solids in the partially polymerized syrup thus obtained was 38.0%, and the syrup had a viscosity of 100,000 centipoise (cP) and a molecular weight of 1,000,000.

INDUSTRIAL APPLICABILITY

The present invention provides a method for producing an (meth)acrylate syrup in which reaction runaway in bulk polymerization does not occur, it is possible to regulate conversion rate and molecular weight stably even at low exothermic temperature without stirring failure and it is also possible to produce a partially polymerized (meth)acrylate syrup.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for producing an (meth)acrylate syrup comprising the steps of:
    a) providing a (meth)acrylate ester monomer for bulk polymerization;
    b) providing 2,4-diphenyl-4-methyl-1-pentene together with a thiol chain transfer agent as a chain transfer agent; and
    c) initiating bulk polymerization by adding an initiator having the half-life of up to 30 minutes at 55-80° C.;
    wherein the initial reaction temperature is 55-80° C.;
    wherein the peak reactor temperature is maintained below 85° C.;
    wherein the reactor conversion rate as 5-50 weight %; and
    wherein molecular weight of the bulk polymerized (meth)acrylate syrup is 220,000-1,200,000.

2. The method for producing an (meth)acrylate syrup as set forth in claim 1, in which 0.1-100 weight part of every 100 weight part of (meth)acrylate ester monomer is acrylic acid alkyl ester monomer.

3. The method for producing an (meth)acrylate syrup as set forth in claim 1, in which an initiator is used by 0.0001-0.5 weight part for 100 weight part of(meth)acrylate ester monomer.

4. The method for producing an (meth)acrylate syrup as set forth in claim 1, in which 2,4-diphenyl-4-methyl-1-pentene was used by 0.001-5.0 weight part for 100 weight part of (meth)acrylate ester monomer.

5. The method for producing an (meth)acrylate syrup as set forth in claim 1, in which a thiol chain transfer agent is used by 0.00001-5.0 weight part for 100 weight part of (meth)acrylate ester monomer.

6. The method for producing an (meth)acrylate syrup as set forth in claim 1, in which a partially polymerized (meth)acrylate syrup having 5-98% conversion rate was prepared by adding an initiator once or more.

* * * * *